United States Patent [19]

MacMillan, Jr. et al.

[11] Patent Number: 5,179,585
[45] Date of Patent: Jan. 12, 1993

[54] INTEGRATED VOICE MESSAGING/VOICE RESPONSE SYSTEM

[75] Inventors: Duncan J. S. MacMillan, Jr., Los Altos Hills; Stephen M. Andre, Fremont; Lee A. Davis, San Rafael; Shin-Jou Fang, Saratoga, all of Calif.

[73] Assignee: Octel Communications Corporation, Milpitas, Calif.

[21] Appl. No.: 642,013

[22] Filed: Jan. 16, 1991

[51] Int. Cl.⁵ .................. H04M 3/50; H04M 3/58
[52] U.S. Cl. .................. 379/88; 379/89; 379/97; 379/212; 379/201
[58] Field of Search .......... 379/67, 88, 89, 97, 379/212, 214, 201

[56] References Cited

U.S. PATENT DOCUMENTS

| | | | |
|---|---|---|---|
| 4,785,408 | 11/1988 | Britton et al. | 379/88 X |
| 4,935,956 | 6/1990 | Hellwarth et al. | 379/112 |
| 5,036,533 | 7/1991 | Carter et al. | 379/59 |

FOREIGN PATENT DOCUMENTS 0330441 8/1989 European Pat. Off. .

OTHER PUBLICATIONS

Syntellect, Inc., Shadow Operator brochure, Aug. 1989.
Dataquest Incorporated, *Dataquest Research Bulletin*, "Voice Processing Systems: VMX Establishes Applications-Oriented Foothold in the Interactive Voice Response Market," May 1990.
VMX, Inc., D.I.A.L./IVR brochure, 1988.
VMX, Inc., "Introducing VMXworks . . . ", Apr. 1990.
VMX, Inc., "VMXworks" (product description), undated.

*Primary Examiner*—Thomas W. Brown
*Attorney, Agent, or Firm*—Jeffrey H. Ingerman

[57] ABSTRACT

An integrated voice messaging/interactive voice response system in which information given by a caller or known to a system database could be transferred among various application modules of the system is provided. The information is passed in the form of parameters in messages sent by one system module to another.

10 Claims, 7 Drawing Sheets

INTEGRATED VOICE MESSAGING/VOICE RESPONSE SYSTEM

BACKGROUND OF THE INVENTION

This invention relates to a telephone response system in which voice messaging ("voice mail") and voice response features are integrated. In particular, this invention relates to a system having application modules that implement both voice messaging and voice response features, in which, during a single telephone call, information gathered in one module in the course of implementing one feature is transferred among the modules.

In known voice messaging systems, a caller can leave a message for a call recipient who is not able to receive a call. The message is stored in a central memory device, which stores all messages received for all telephone extensions on the system, and is designated as being for a specific recipient. Only the designated recipient can retrieve his or her own messages. The universe of messages designated as being for a single recipient is referred to as the recipient's "mailbox", although the messages may be stored randomly in the memory device. Typically, such systems allow the caller to edit a message before finally "sending" it to a mailbox, and also allow the caller to dial other extensions, either before or after leaving a message. The system accepts command inputs for such functions by "collecting" digits entered using a DTMF (dual-tone multi-frequency) telephone keypad, more commonly known by the name TOUCH-TONE. However, once an outside caller dials a new extension, as far as the new call recipient (or his or her mailbox if he or she cannot take the call) is concerned, the caller may just as well have called in from outside the system.

Voice response systems are also known. In the earliest and simplest voice response systems, a caller could dial into a computerized database—e.g., one's bank credit card database—and enter queries, usually in response to menu prompts. As in voice messaging systems, user inputs—e.g., one's account number—are entered using DTMF tones. The system output is an audio response in the form of computer synthesized speech or concatenated pre-recorded words and phrases.

In a second level of sophistication, voice response systems have additional capabilities, such as "voice forms" capability (where, e.g., a vendor can collect the caller's name, address, and the product the caller wants to order, by recording the caller's voice responses to recorded prompts). These more sophisticated systems also provide the user with the option of transferring to a human operator for further assistance, either by staying on the line for a specified time interval past the end of the computer response (the primary purpose of this feature is assist rotary-dial telephone users or those who become confused and do not enter any tones for the specified interval), at designated times as a menu option (e.g., after a computer response to a query, the user could be given the choice of entering another query or transferring to an operator or another extension, as well as terminating the call), or at any time by pressing a particular key, such as the zero key. The extension to which the call is transferred could be another voice response feature. However, any information the caller gave to the first feature would not be available to the second feature and would have to be given again by the caller.

Because both voice messaging and voice response systems have as options the ability to transfer to other extensions, in an installation having both types of systems it could be said that the systems have been integrated. A caller could always transfer from one system to the other by dialing the other system's extension from the first system, assuming those extensions were known to the caller or included in the system prompts. Thus, a caller attempting to reach a particular individual could leave a message in that individual's mailbox and then transfer to a voice forms feature to order particular merchandise. Conceivably, the caller could then transfer to some other voice response feature. However, each time the caller would have to repeat information previously given. For example, even though the caller gave his or her name in the voice mail message, he or she would have to repeat it for the voice form. At most, there are previously known systems in which, when a caller transfers to a human operator, the operator is informed of where in the voice response system the caller is exiting from (e.g., session screen identification number), without any additional information.

Similarly, a caller may access a voice response feature in which digital information is called for, and then transfer to another feature also requiring digital entries, and be required to enter the same information again.

It would be desirable to be able to provide an integrated voice messaging/interactive voice response system in which information given by a caller could be transferred among various application modules of the integrated system.

SUMMARY OF THE INVENTION

It is an object of this invention to provide an integrated voice messaging/interactive voice response system in which information given by a caller could be transferred among various application modules of the integrated system.

In accordance with this invention, there is provided an interactive voice response system including interface means for connecting the interactive voice response system to one or more incoming telephone lines through which a caller communicates with the system, one or more voice response application modules, each performing a respective voice response feature, and a voice response processor linking the interface means to the voice response application modules, wherein at least one of the voice response application modules is capable of gathering data from the caller, the caller may transfer among the voice response application modules, and the voice response processor passes at least a portion of the gathered data from the at least one of the voice response application modules to other of the voice response application modules when the caller transfers among the voice response application modules.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

In accordance with the present invention, a voice processing system supporting a number of voice messaging and interactive voice response features is linked to a user site Private Branch Exchange (PBX) or central office-based telephone system (such as that known by the name CENTREX). Included voice messaging features might be voice mail and automated attendant, while included interactive voice response features might be "traditional" interactive voice response (query database and get response), voice forms, and voice bulletin boards. Other applications may also be available.

A caller may enter the voice processing system of the invention either through a voice messaging feature after leaving a message for an absent party and then transferring to some other feature, or by dialing directly into a particular feature, assuming that that feature has a direct telephone line or is available through a main menu. Each feature is a separate application module of the voice processing system, and is programmed in accordance with the needs of the particular installation.

The voice processing system unit may be further connected to one or more host computers, as necessary to service the various application modules. The link between the voice processing unit and the host computer is a communications link preferably governed by a conventional terminal emulation protocol such as the IBM "3X74" emulation protocol, although other protocols may be used.

Figure 1:
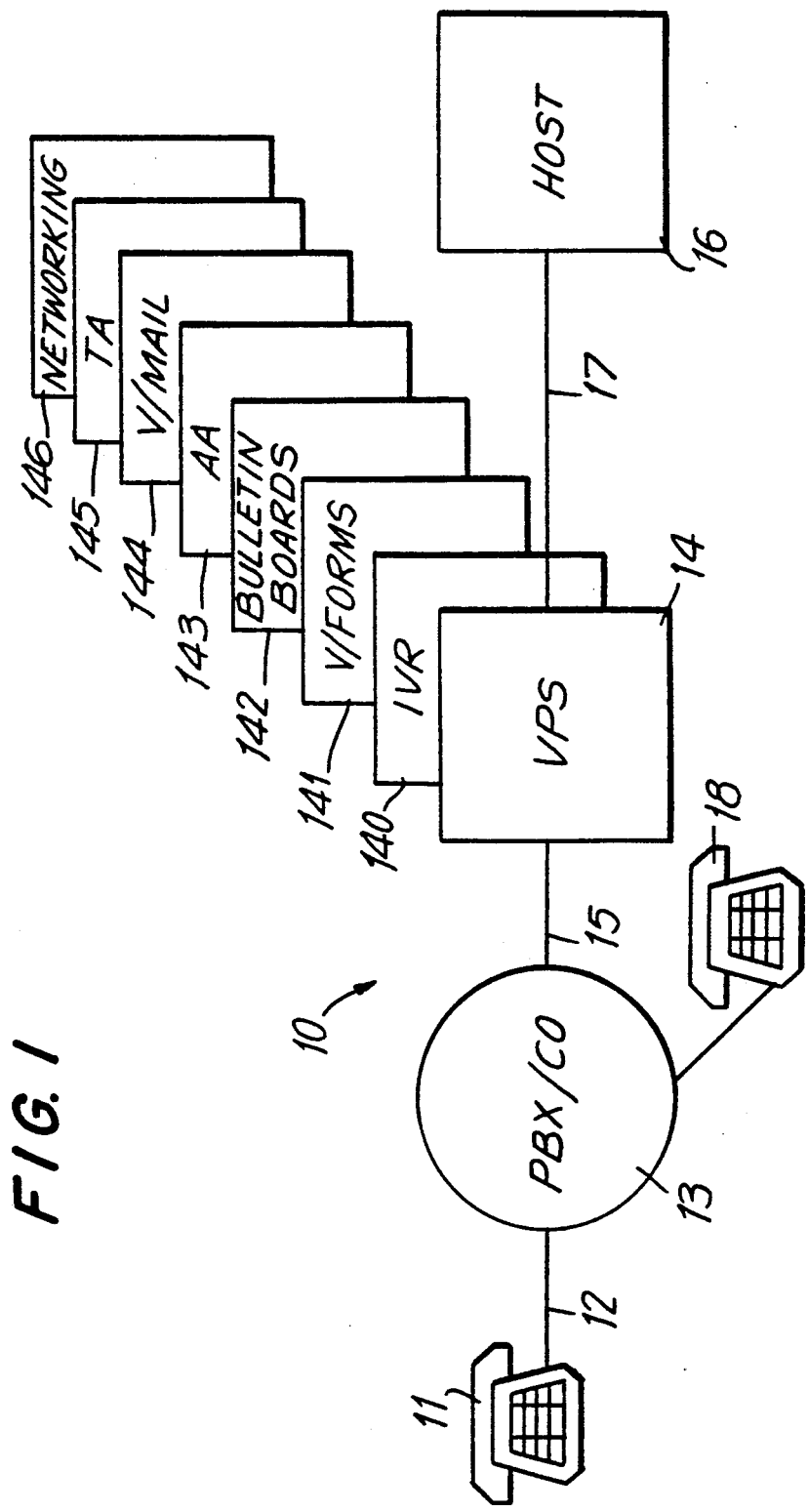
FIG. 1 is a conceptual representation of an integrated voice messaging/voice response system according to the present invention.

The conceptual layout of system 10 according to the invention is shown in FIG. 1. A caller at originating telephone 11 is connected over the public switched network 12 to the system owner's PBX or the central office serving the system (if the system owner's installation uses a phone company system such as CENTREX) at 13. PBX or central office 13 is connected to the voice processing system unit 14 by link 15 of the type conventionally used for such connections. PBX or central office integration on link 15 may be provided, which allows the system to know the identity of the party called, the reason for forwarding the call to the system (e.g., the caller's original destination is busy), etc., which may be useful for certain voice messaging or interactive voice response features.

Voice processing system unit 14 supports a plurality of different voice processing application modules as determined by the system owner. In the exemplary preferred embodiment shown in FIG. 1, voice processing system unit 14 supports interactive voice response module 140, voice forms module 141, voice bulletin board module 142, automated attendant module 143, voice mail module 144, telephone answering module 145 and message networking module 146. Modules 140-142 are, broadly, interactive voice response modules, while modules 143-146 are voice messaging modules. While the application modules used in voice processing system unit 14 may involve additional hardware, they are preferably implemented within system unit 14 as software.

Voice processing system unit 14 also may be connected to one or more host computers 16, as required by the supported interactive voice response application modules. The connection between system unit 14 and host computer 16 is a link 17 of the type conventionally used for such connections. Communications over link 17 may be carried out under the emulation protocol appropriate to the computer 16, or by some other data communication method such as the protocols described in CCITT Recommendations X.25, 802.3, etc.

Figure 2:
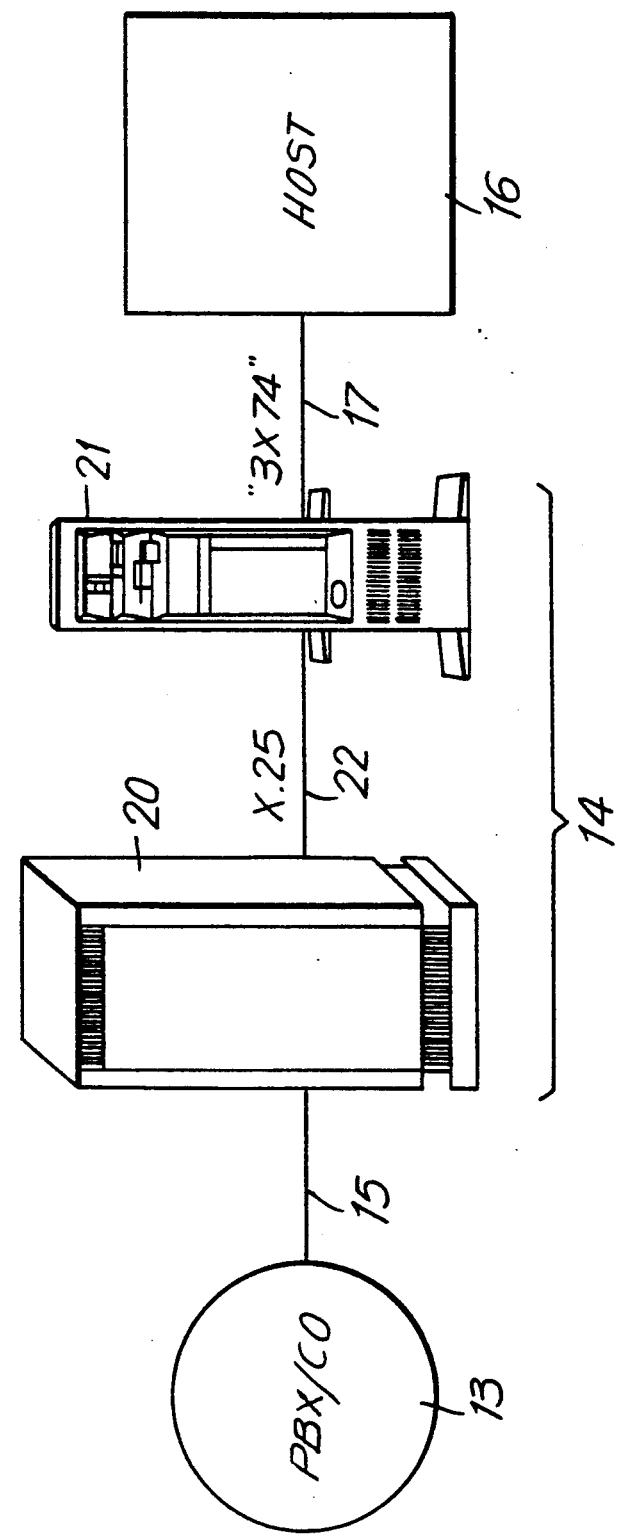
FIG. 2 is a diagram of a preferred hardware configuration of a system according to the present invention.

A preferred hardware configuration for a system according to the invention is shown in FIG. 2. As seen in FIG. 2, the system according to the invention includes a voice processing system processor unit 20 linked to a PBX or telephone company central office 13 by conventional links 15. A voice processing application processor unit 21, which could be a conventional IBM ®-compatible microcomputer having an Intel ® 80386 or better microprocessor, is linked to processor unit 20 by one or more links 22 (e.g., under the protocol described in CCITT Recommendation X.25). Application processor 21 controls access to the various voice processing application modules in voice processing system processor unit 20 in accordance with software routines. Processor 20 and application processor 21, as linked, together form system unit 14 of FIG. 1. As shown in FIG. 1, system unit 14 may be linked to host computer 16 by link 17.

In accordance with the X.25 protocol, each incoming call is assigned to an X.25 virtual circuit by assigning to it an X.25 "logical channel identifier." As the caller enters various keystrokes, commands are sent back and forth over link 22 between processor 20 and application processor 21, which may emulate a terminal of host computer 16, allowing application processor 21 to extract and enter data from and into host computer 16. If, while the caller is in a particular application module, he or she enters or speaks certain information (e.g., name, account number), that information, or a memory address indicating where that information is stored, is passed between processor 20 and application processor 21, along with the logical channel identifier, so that the system always knows which call is being serviced and where to find information already given by the caller. If the information given is digital information, it is preferably stored in application processor 21, while voice information is preferably stored in processor 20. However, in systems in which there is more than one application processor 21, all information may be stored in processor 20, so that it is accessible to all modules on all processors 21, in which case processor 20 would pass to processors 21 the storage locations of the data rather than the data themselves.

Thus, when the caller transfers into an application module requiring keystroke data entries, the system checks to see whether or not there are any keystroke data stored as a result of the caller having been in a different application module requiring such entries. Similarly, if the caller has been sufficiently identified, the system may have retrieved and stored data about the caller previously known to host computer 16. If there are such data stored, the system passes appropriate data to the new application module, and the new module does not prompt the caller to enter that data again.

For example, if the system is operating in a mail-order environment, there may be an application module in which a caller can check the status of an existing order, as well as an application module for placing new orders, both of which might require entry of an account or customer number, possibly a password, and possibly other data in common. When the caller enters one of those application modules, the system will check to see if any of the required data for that module, that are of a type that is also required in the other module, have previously been entered. If they have, the system will pass that information to the second module, which then will skip over any prompts it would otherwise give for the caller to enter those data. In this example, if the caller first checked on an existing order, and in so doing entered an account number, a password, and the order number of the order being checked on, the system would store the account number, password and order number in memory as being potentially useful in other modules. The system would also recall from the host computer other information associated with the account number, which would then also be available for other modules. If the caller then transferred to the new order module, the system would automatically enter the account number and password, which otherwise might be the first two prompts, and the first thing the user would be asked for might be the catalog numbers of the products being ordered. The system would work similarly if the new order module were entered first and the order checking module entered second, as well as between other modules requiring similar keystroke data entries.

The system may also operate in this manner in application modules requiring spoken data entries. For example, a caller may first enter an application module requiring him or her to speak his or her name in response to a first prompt, his or her address in response to a second prompt, and then other module-specific information in response to subsequent prompts. If the caller then transfers to a second application module requiring spoken entries, the system would pass the spoken name and address data (or their location) to the second module, and the caller would not be prompted for that information again. Such a feature could even be useful when the second "module" is the telephone extension 18 of a human being. In that case, when the human being answers the telephone, he or she hears an introduction announcement before the call is connected, stating that there is an incoming call from the caller, whose name might be spoken in the caller's own voice. If the human being is unavailable, and the caller is transferred to a voice mailbox, a preamble is recorded in the mailbox before the caller's message, identifying the caller, perhaps in the caller's own voice. Additional information previously entered by the caller or known to host computer 16 can also be indicated in the preamble as desired. To make this feature particularly useful, the caller preferably is informed, before being connected either to the human being or the voice mailbox, that it is not necessary to further identify him- or herself; otherwise, he or she would defeat the purpose of the feature by speaking his or her name again.

A telephone call linking several application modules on a system according to the invention, with information passed among the modules, can be referred to as a "compound session". The only prerequisite for establishing a compound session is that the first module called be an interactive voice response module as opposed to a voice messaging module, because establishment of a compound session in the preferred embodiment requires the control of application processor 21. However, this can be guaranteed by routing all incoming callers to an interactive voice response module offering a menu of available modules. The passing of information in a compound session can be referred to as an "introduction"—where the information is passed to a human operator—or a "preamble"—where the information is passed to another module in the system.

Figure 3:
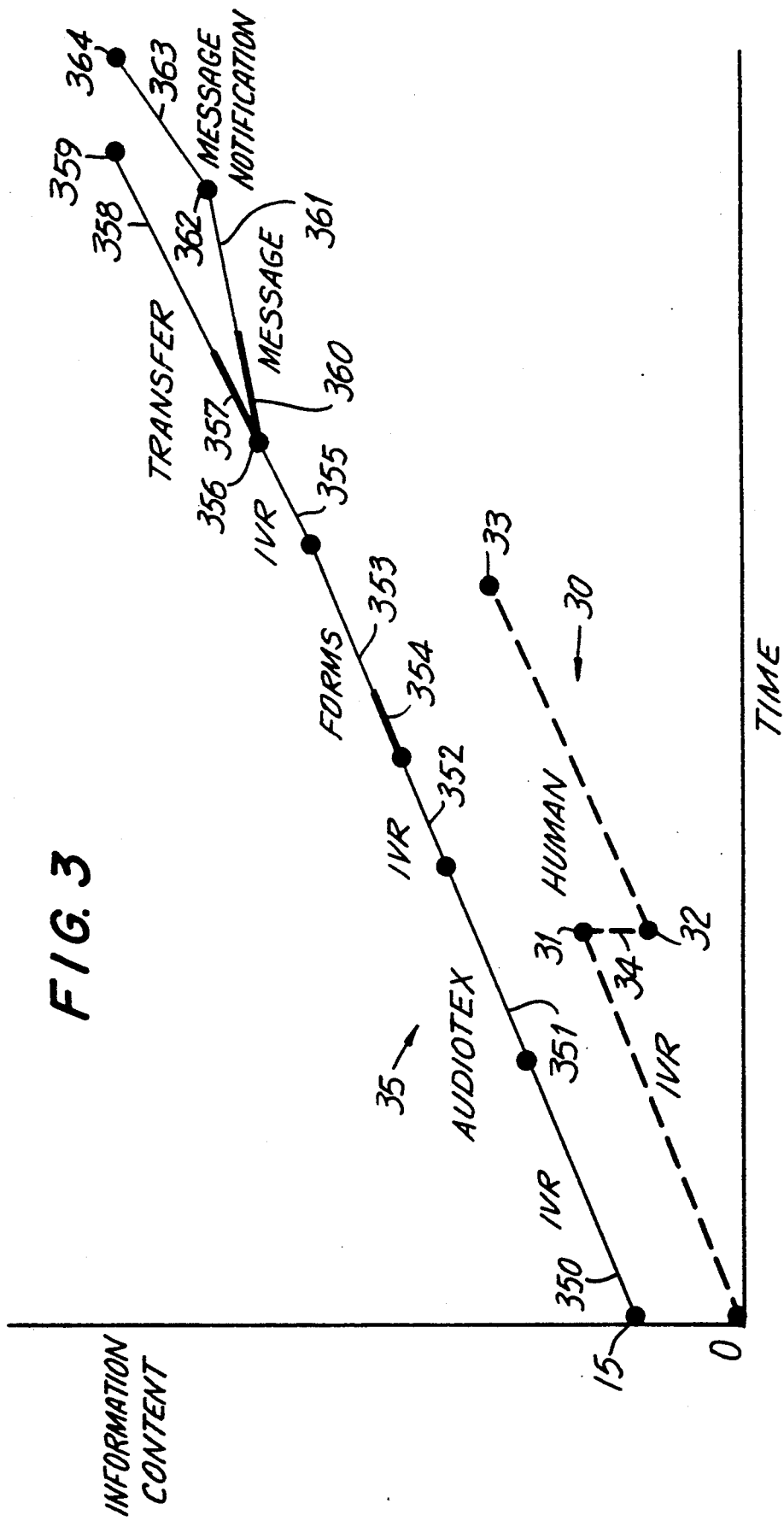
FIG. 3 is a graphical representation comparing the information content of a telephone call session on a system according to the invention, as compared to a previously known system.

The progress of a telephone call session on a system according to the invention such as that represented in FIGS. 1 and 2 is shown in FIG. 3, along with the progress of a call session on a previously known type of system. FIG. 3 is in the form of a graph in which the abscissa represents time and the ordinate represents the information content of the session.

In traditional session 30, the caller has called a traditional audio response unit which might, for example, report the caller's account balance at 3 in response to the keystroke entry of an account number. If the caller requires further information at that point, the system provides the option of transferring to a human operator at 32. After the caller has been assisted by the human operator, the total information value of the session at 33 is higher than it is at 32. However, in going from point 31 to point 33, the session goes through a temporary drop in information content at 34, because there was no way for the system to pass to the human operator the information that the caller has previously entered or information about the caller previously known by the host computer.

On the other hand, for example, in a system according to the present invention, as described below, the human operator, before being connected to the caller at 32, might have heard an introduction including a synthesized spoken version of the caller's name derived from information stored in connection with the account.

In session 35 using the system according to the invention, the information value continually increases as the caller moves from application module to application module. Continuing the mail order example used above, session 35 may start in interactive voice response application module 350 in which the caller can obtain charge account balance information.

Moving to audiotex module 351, the caller could obtain instructions on how to order merchandise, which could be accomplished in interactive voice response module 352. The caller's charge account number, already entered in module 350, is effectively passed (in fact, the data are retained for use by subsequent modules, and the memory locations are passed) to module 352, along with the caller's name and address which are derived from the account number as stored in host computer 16. Thus in ordering module 352 the caller is not prompted for name, address or account number, although he or she would be prompted for such data if he or she calls first to ordering module 352 or not as part of a compound session.

Next the caller can transfer to voice forms module 353 where he or she can request mailing of the newest catalog. Here, the system plays back a computer-generated or -spoken preamble 354 which supplies as much of the information that would be required to fill in the voice form as can be derived from information entered by the caller earlier in the session (such as the caller's account number), or from information known to host computer 16 (such as the caller's name and address). Thus, here the caller is again spared from having to repeat his or her name and mailing address, and need only specify, in response to a prompt, the catalog desired.

After requesting the catalog, the caller transfers to interactive voice response module 355 where he or she can determine the status of a previous order by entering the order number. Whereas a caller calling directly to module 355 might have to enter identifying information to verify that he or she is entitled to know the status of the order, all of the necessary identifying information is passed to module 355 by the system if it has previously been entered.

Finally, the caller may attempt at 356 to transfer to his or her customer service representative. If the customer service representative is available and answers the telephone, an introduction 357 will be played identifying the caller by name. Introduction 357 may also report to the customer service representative the various application modules that the caller has already "visited", to enable the representative to give the caller better service. Further, because of PBX/central office integration at 15, the system can also tell the customer service representative which application module—or person's extension—the caller's call was originally directed to. The caller and the customer service representative then conduct a conversation 358, which ends at the information content level represented by point 359, well above the information content level at point 33.

If at point 356 the customer service representative is not available, the caller is transferred to the customer service representative's voice mailbox. However, before the caller is connected to the mailbox, a preamble 360, similar in content to introduction 357, is recorded into the mailbox. The caller, who is preferably informed that it is not necessary to further identify oneself, can then leave a message at 361. The customer service representative is notified of the message at 362 and plays it back at 364, and the transaction ends at 365, at the same information content level as point 359. Alternatively, the representative on being notified of the message at 362 may determine that a different representative is better qualified to handle the message, in which case the first representative, using message notification or message networking, would send the message to the second representative who would play it back at 365.

In the particular session 35 as shown, the caller identifies him- or herself through keystroke entries before any spoken identification is required. Therefore, in all spoken identifications of the caller during the session—i.e., in voice forms module preamble 354, transfer introduction 357 and voice mail preamble 360—a synthesized spoken version of the caller's name would have to be used, assuming the system has voice synthesis capability. It is equally possible according to the invention, however, that the caller will call first to, for example, voice forms module 353, in which case a spoken name in the caller's own voice is available to be used where appropriate.

It should be understood that the order of application modules visited in session 35 is illustrative only, and that users of systems according to the present invention may navigate among the available application modules in any desired order. It should be further understood that the present invention can be used in any type of integrated voice messaging/interactive voice response system, and not only the mail order system described in connection with FIG. 3, which is illustrative only.

Figure 4:
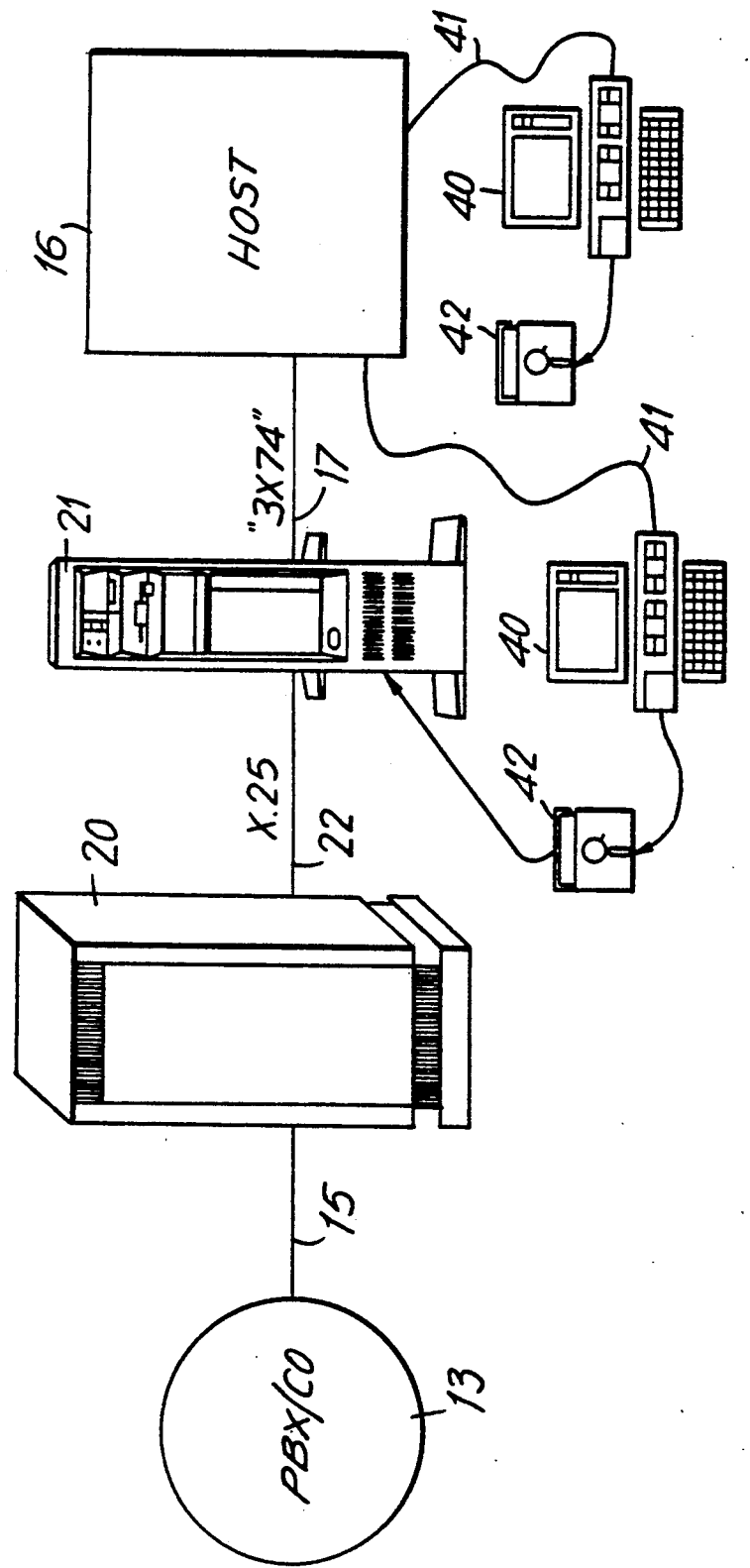
FIG. 4 is a diagram of a preferred hardware configuration of a system according to the present invention including apparatus for programming applications.

As indicated above, in the preferred embodiment the various voice response application modules are run as software routines in IBM ®-compatible application processor 21, which operates in a terminal emulation mode of host computer 16. This facilitates programming of the voice response application modules, as illustrated in FIG. 4. Because the voice response application modules that interface with host computer 16 are simply entering data into fields on screens for particular types of inquiries, programming computers 40, which are also IBM ®-compatible personal computers, can be used to run through the "script" of each type of inquiry on host computer 16 in the same terminal emulation mode via links 41. Using that script, the prompts necessary for the particular voice response application module can be developed, tested and stored on diskettes 42. Using this off-line programming facility, new routines can then be loaded onto application processor 21 to update the various voice response application modules with minimal downtime or other negative effects on other applications or sessions supported by voice processor 20 and application processor 21. It is understood, of course, that instead of transferring new routines on diskettes 42, programming computers 40 could be directly linked (not shown) to application processor 21.

The system according to the invention has thus far been described as having an application processor 21 as part of the system, linked to an external host computer 16. However, it is equally possible that the application processor and host computer are the same processor 21. This is more and more likely as the processing power of so-called "personal" computers increases. Similarly, both the "host" and "application processor" functions could be carried out by a larger processor 16. In either such case, application processor/host 16 or 21 would communicate with processor 20 over a data communication link such as X.25 link 22, and there would be no need for terminal emulation link 17.

In the preferred embodiment, the system functions by having voice processing processor 20 collect DTMF digits and caller voice responses. The DTMF digits are decoded into pure digital data and transferred over X.25 link 22 to application processor 21, while the voice data are stored in processor 20 and their address(es) sent digitally over link 22. Digital data sent to application processor 2 are maintained throughout a session to be used when needed by the various modules. Voice data stored in processor 20 are maintained for a predetermined duration that is passed to application processor 21 so that processor 21 knows how long the voice data will remain available.

Figure 5:
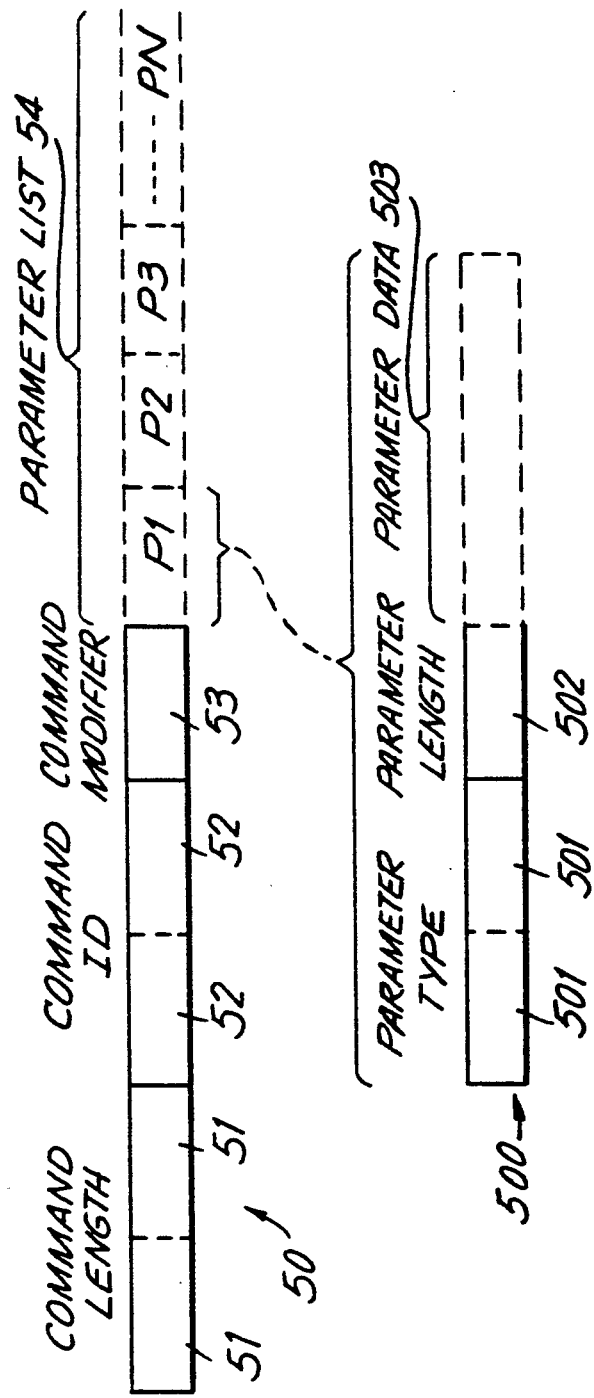
FIG. 5 is a diagram of an X.25 packet format used in implementing the system according to the invention.

Messages sent over X.25 link 22 are in conventional X.25 format, which is well known to those of ordinary skill in the art. That format includes an identification of the virtual circuit. The content of the data area of an X.25 message packet according to the system of the invention is shown diagrammatically in FIG. 5. X.25 data 50 as a whole constitute a command of the system according to the invention. The command begins with two bytes 51 containing the command length, which tells the receiving processor (20 or 21) how long a command string to look for. Next in the command string are two bytes 52 containing the command identifier, which tells the receiving processor the command type. Next is a single byte 53 known as the "command modifier", which indicates whether the message is a command, a response to a command, or an error message. Finally, there are a variable number of bytes 54 (hence the length given in bytes 51) containing parameters passed for use in implementing the command. The structure of each parameter is shown at 500. Each parameter begins with two bytes 501 identifying the parameter type. Certain types of parameters have fixed length, and their types are sufficient to indicate the length of the remainder of the parameter data. However, for parameter types which take variable length data, byte 502 is provided to indicate total parameter length. Following bytes 501 (or bytes 502 in variable length cases) are the actual parameter data 503. As stated above, the parameters passed can include digital data entered by a caller as well as digital addresses of voice or digital data entered by a caller and stored in processor 20.

Figure 6A:
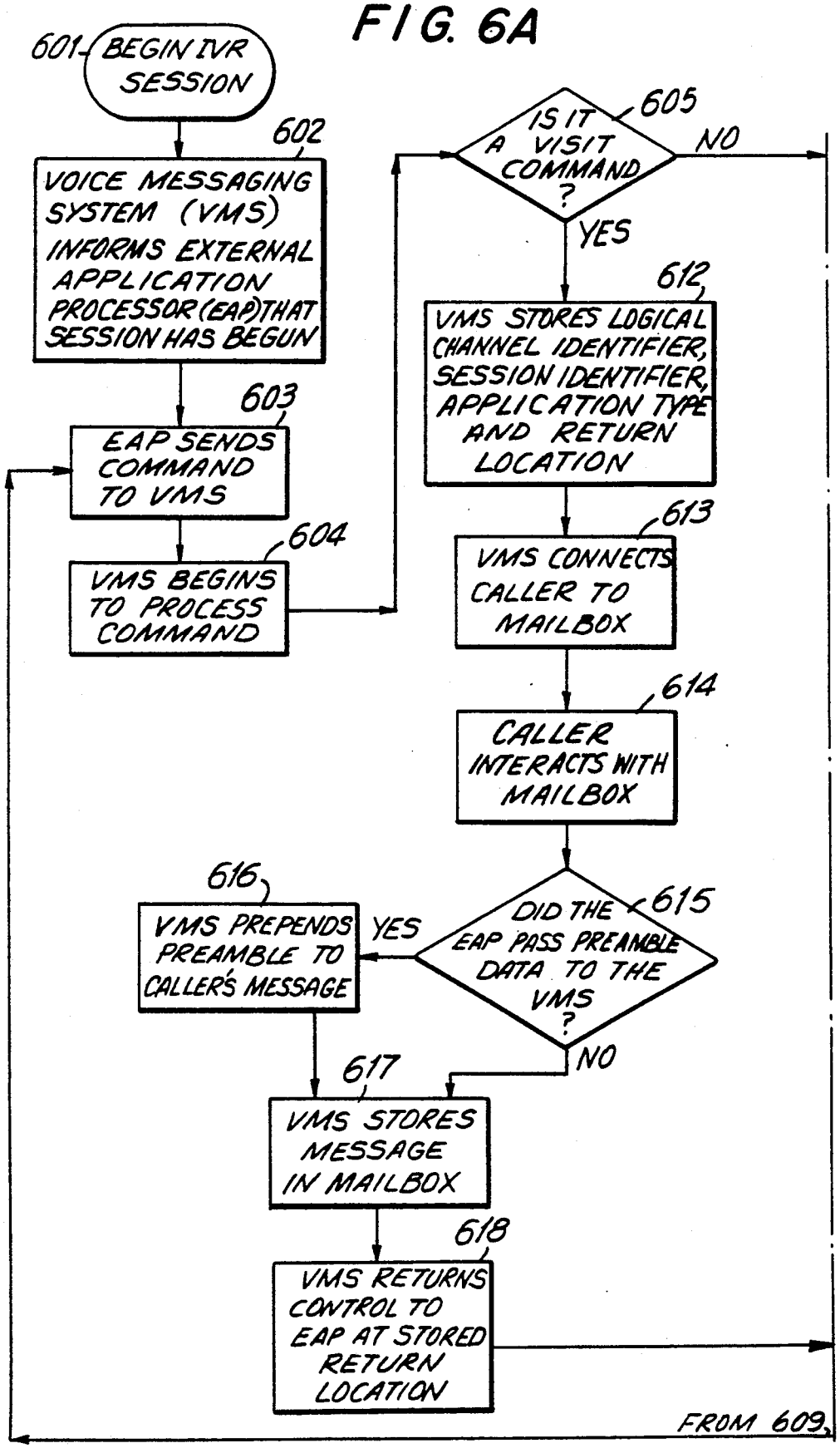
FIGS. 6A and 6B (hereinafter collectively referred to as FIG. 6 are a flowchart showing the implementation of the system according to the invention.
Figure 6B:
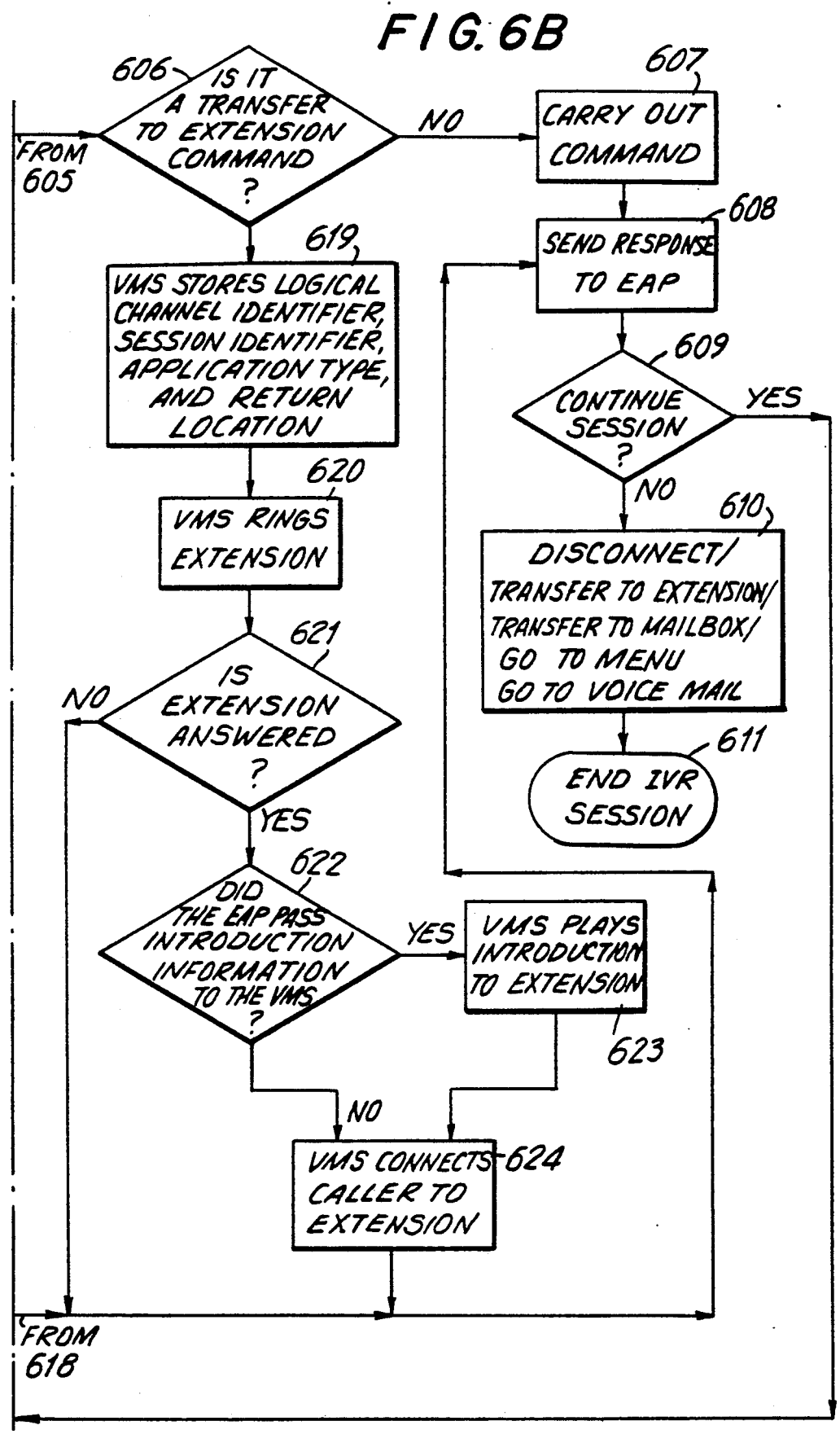

The logical flow of an interactive voice response ("IVR") session according to this invention is shown in diagrammatic flowchart form in FIG. 6. The IVR session begins at 601, when the voice messaging system ("VMS") (processor 20) transfers a caller to an IVR mailbox. At that time, as seen in step 602, the VMS sends a message to external application processor ("EAP") 21 saying that the session has begun. The EAP now has control of the session, and at step 603 the EAP sends a command to the VMS. Alternatively, the EAP could have started the session by telephoning the "caller" through the facilities of the VMS (e.g., in a telemarketing application). Once the "caller" answered, he or she would be connected to the IVR mailbox as at 601.

The VMS begins processing the command at step 604. The first processing step at test 605 is determining whether or not the command is a command to "visit" a mailbox (either to a leave a message for a person or to fill in a voice form). If, at test 605, the command is not a visit command, then at test 606 the VMS tests to see if it is a command to transfer the call to a voice extension. If, at test 606, the command is not a transfer command, then the VMS carries out the command at step 607 (e.g., collect digits or play phrases for the EAP application) and sends a response to the EAP at step 608 indicating completion of the command.

At test 609, the system determines (based, e.g., on user inputs or other criteria, as determined by the EAP programming) whether or not the session is to continue. If the session is to continue, the system returns to step 603 and the EAP sends a new command. If, at test 609, the session is not to continue, then at step 610 the VMS makes the appropriate disposition of the call according to the command sent by the EAP in accordance with its programming, and the session ends at 611.

If, at test 605, the command is a visit command, then at step 612 the VMS stores the logical channel identifier, the session identifier, the application type, and a return location, so that at the end of the visit it will know to where to return. The VMS then connects the caller to the mailbox to be visited at step 613, which could be an ordinary mailbox or a voice form or other type of mailbox. At step 614 the caller interacts with the mailbox, entering all the commands normally associated with the mailbox to erase, re-record, playback or, finally, send the message and exit the mailbox. Once the caller indicates that he or she is ready to send the message and leave the mailbox, then at test 615, before actually sending the message and leaving the mailbox, the VMS tests to see if the EAP had passed it any preamble data. If the EAP had passed preamble data to the VMS, at step 616 the VMS prepends that preamble data to the message stored by the caller, and at step 617 stores the message with the preamble in the mailbox. If at test 615 the VMS determines that the EAP had not passed any preamble data, then the caller's message is stored at step 617 without a preamble. The VMS then returns control of the session to the EAP at step 618. The visit diagrammed in steps 612–618 is logically identical to the carrying out of any command (cf., step 607), and so after returning control to the EAP at step 618, the VMS sends a response to the EAP at step 608, and the session continues from there as described above.

If at test 605 the command is not a visit command but at test 606 it is a transfer command, then at step 619 the VMS stores the logical channel identifier, the session identifier, the application type, and a return location, so that if the transfer is unsuccessful, the VMS can return control to the EAP and the session can continue. At step 620, the VMS rings the desired extension and tests at test 621 to see whether or not the extension is answered. If it is, then at test 622 the VMS tests to see whether or not the EAP has passed any introduction information. If the VMS has received introduction information, then at step 623 the VMS plays the introduction information to the extension, and then connects the caller at step 624. If at test 622 there is no introduction information, then at 624 the caller is connected directly without an introduction. The VMS then sends a completion response to the EAP at step 608, as above. Once the caller is connected to a human being, the VMS loses control of the call. Therefore, in this case the determination made by the EAP at test 609 is not to continue the session. At step 610, the call is identified as having been transformed to the extension and the session ends at 611. While the recipient of the call may transfer the caller back to an IVR application, any information previously entered will have been lost, and a new session would begin.

If at test 621 the extension is not answered after some predetermined interval, then an appropriate response is sent to the EAP at 608, and the EAP determines at 609/610 whether or not to connect the caller to the voice mailbox associated with the called extension. This decision is determined by the EAP programming, which in turn depends on the VMS configuration and the level of PBX/central office integration. If, at 609/610, the EAP determines that the caller should be connected to the mailbox, then as at step 613 the VMS transfers the caller to the voice mailbox associated with the called extension. From there, the session continues as an IVR session, using the data stored in step 619. Thus after leaving message for the intended recipient of the call transfer, the caller may perform other functions, or may decide to end the session by hanging up or by entering the appropriate keystrokes. If at 609/610 the EAP determines that the caller should not be connected to the mailbox, then the EAP ends the session or executes one of the other alternatives at step 610, usually by playing a menu to the caller.

It is understood of course that a caller can disconnect from the system at any time by hanging up or entering an end-of-session command, or may be disconnected by a switching error. In such a case, as long as step 624 has not been reached, the session continues to the point that the VMS responds to the EAP at step 608. In this case the response would indicate that the caller hung up or entered an end-of-session command, and the likely result is that at test 609 the system would terminate the session. However, before doing so it might send a message to a predetermined voice mailbox (e.g., that of the intended call recipient in a transfer, or some designated system mailbox that is regularly emptied by an operator) reporting that the caller, if sufficiently identified, or a caller, if there was insufficient identification, had called.

Thus it is seen that an integrated voice messaging/interactive voice response system in which information given by a caller could be transferred among various application modules of the system is provided. One skilled in the art will appreciate that the present invention can be practiced by other than the described embodiments, which are presented for purposes of illustration and not of limitation, and the present invention is limited only by the claims which follow.

What is claimed is:

1. An interactive voice processing system comprising:
    interface means for connecting said interactive voice processing system to one or more incoming telephone lines, through each of which a caller engages in a respective call session with said system;
    a plurality of voice processing modules, each performing a respective voice processing feature; and
    a voice response processor linking said interface means to said voice processing modules; wherein:
    at least one of said voice processing modules gathers data from said caller;
    said caller transfers among said voice processing modules; and
    said voice response processor passes at least a portion of said gathered data from said at least one of said voice processing modules to other of said voice processing modules when input by said caller results in a transfer among said voice processing modules.

2. The interactive voice processing system of claim 1 further comprising a host computer, wherein at least one of said voice processing modules is a voice response module connected to said host computer for processing data entered into said voice response module by said caller.

3. The interactive voice processing system of claim 2 wherein, in addition to said at least a portion of said gathered data, data related to said caller and previously known to said host computer are passed to said other of said voice processing modules.

4. The interactive voice processing system of claim 2 wherein:
    said host computer supports a database;
    said data entered by said caller comprise queries of said database; and
    said voice response module formats said data entered by said caller into query messages recognizable by said host computer, transmits said query messages to said host computer, receives responses to said query messages from said host computer, and provides voice responses to said queries to said caller.

5. The interactive voice processing system of claim 1 further comprising means associated with said voice response processor for informing a caller, when said caller transfers from one of said voice processing modules to another of said voice processing modules, that said at least a portion of said gathered data has been transferred to said another of said voice processing modules.

6. The interactive voice processing system of claim 1 wherein:
    at least two of said voice processing modules are audio response modules;
    when said caller is connected to a first of said audio response modules, said first audio response module collects audio data from said caller; and
    when said caller transfers to a second of said audio response modules, said voice response processor passes at least a portion of said audio data to said second audio response module.

7. The interactive voice processing system of claim 6 wherein:
    said first audio response module is a voice form module and said collected audio data includes the name of said caller;
    said second audio response module is a call transfer module for transferring said call to a person; and
    when said caller is transferred to said person by said call transfer module, a portion of said collected audio data including at least said name is announced to said person before said caller is connected to said person.

8. The interactive voice processing system of claim 6 wherein:
    said first audio response module is a voice form module and said collected audio data includes the name of said caller;
    said second audio response module is a voice messaging module for recording voice messages in electronic mailboxes assigned to particular individuals; and
    when said caller is transferred to one of said electronic mailboxes by said voice messaging module, a portion of said collected audio data including at least said name is entered into said mailbox as an introduction before said caller is connected to said mailbox.

9. The interactive voice processing system of claim 1 wherein:
    at least two of said voice processing modules are digital response modules;
    when said caller transfers to a first of said digital response modules, said first digital response module collects digital data from said caller; and
    when said caller transfers to a second of said digital response modules, said voice response processor passes at least a portion of said digital data to said second digital response module.

10. The interactive voice response system of claim 1 wherein:
    said incoming telephone lines are directed to said system by one of (a) a telephone company central office and (b) a private branch exchange;
    one or more of said incoming telephone lines are assigned to particular destinations;
    said system is integrated with said one of (a) said telephone company central office and (b) said private branch exchange, such that said system associates an incoming call with one of said destinations; and
    said voice response processor passes said destination to at least one of said voice processing modules when input by said caller results in a transfer among said voice processing modules.

* * * * *